United States Patent [19]
Watts

[11] 4,201,392
[45] May 6, 1980

[54] HIGH AND LOW PRESSURE SEAL

[75] Inventor: James T. Watts, Fullerton, Calif.

[73] Assignee: Grant Oil Tool Company, Los Angeles, Calif.

[21] Appl. No.: 30,285

[22] Filed: Apr. 16, 1979

[51] Int. Cl.² .............................................. F16J 15/32
[52] U.S. Cl. ................................ 277/165; 277/188 R; 277/205
[58] Field of Search .................... 277/165, 205, 206 R, 277/212 R, 212 C, 179, 180, 188 R, 188 A, 190, 191, 193, 152, 153

[56] References Cited

U.S. PATENT DOCUMENTS

| | | | |
|---|---|---|---|
| 2,705,177 | 3/1955 | Waring | 277/205 X |
| 2,979,350 | 4/1961 | Lansky | 277/205 X |
| 3,271,038 | 9/1966 | Bastow | 277/205 |
| 3,563,558 | 2/1971 | Doutt | 277/205 |
| 3,603,603 | 9/1971 | Woodson | 277/165 |

FOREIGN PATENT DOCUMENTS

| | | | |
|---|---|---|---|
| 343277 | 10/1921 | Fed. Rep. of Germany | 277/205 |
| 668356 | 3/1952 | United Kingdom | 277/165 |
| 1019523 | 2/1966 | United Kingdom | 277/205 |

*Primary Examiner*—Robert S. Ward, Jr.
*Attorney, Agent, or Firm*—Spensley, Horn, Jubas & Lubitz

[57] ABSTRACT

This invention discloses a seal assembly for use in high and/or low pressure applications which allow for selective bleeding in a given direction of fluid flow. The seal assembly includes a resilient seal ring, a split spacer ring, and a split back-up ring, all interacting in a manner such that when subjected to pressure from one direction, the resilient seal ring pivots about the spacer ring, permitting bleeding of fluid across the seal. When subjected to pressure from the opposite direction, the resilient seal ring is forced against the split back-up ring, thereby forming a tight seal, preventing leakage.

11 Claims, 4 Drawing Figures

HIGH AND LOW PRESSURE SEAL

BACKGROUND

1. Field of the Invention

The present invention provides a deformable high pressure seal assembly which allows for selective bleeding of pressure fluid in one direction, and seals against high pressure in the other direction.

2. Prior Art

Seal ring assemblies are typically used to prevent high pressure fluid from traveling across an annular channel or opening. Such seals may be subjected to pressures up to 20,000 pounds per square inch from either axial direction. Such operating conditions have caused problems due to the seals extruding through the channel or opening.

A seal assembly is disclosed in U.S. Pat. No. 3,394,941 wherein the seal ring assembly opposes fluid pressure in a forward axial direction. This seal ring assembly includes an elastomeric ring, a first nonelastomeric ring engageable with the elastomeric ring, and a second nonelastomeric ring configured to prevent harmful extrusion of the elastomeric ring when acting as a sealing surface against the high pressure fluid. The nonelastomeric rings are preferably fabricated from a fluorocarbon and reinforced with embedded fibers.

U.S. Pat. No. 3,885,801 discloses a ring assembly for sealing in two directions. The ring assembly comprises an elastomeric seal ring with a pair of lips, and a solid elastomeric loading ring disposed between the lips. A pressure inverting pedestal ring is also used in the assembly and is active on the loading ring such that when the fluid pressure is behind the pedestal ring, the fluid pressure bypasses the pedestal ring and acts upon the loading ring to deform the same to press the lips into sealing engagement. When fluid pressure originates from the opposite direction, the seal ring and loading ring are brought into sealing engagement with the pedestal ring.

U.S. Pat. No. 4,013,299 is directed to yet another configuration for a seal ring. In this patent, the seal ring provides for sealing in one axial direction. The sealing ring comprises a U-shaped cup having a pair of lips for forming a cavity therebetween, and an elastomeric expander ring mounted within the cavity. Sealing edges on the lips are contacted by members to be sealed and are positioned on the outside of the lips at a vertical location at or below the horizontal center line of an expander ring when the expander ring is mounted within the cavity. This particular orientation of the sealing edges reduces the rotation of the inner top lip portions into the expander ring, thereby keeping the sealing edges in contact with the members to be sealed.

Other similar sealing assemblies are disclosed in U.S. Pat. No. 3,603,603 to Woodson, and U.S. Pat. No. 3,109,661 to Swain et al.

The inventions described in these prior art references all relate to a sealing assembly designed to oppose high fluid pressure across the seal in either one or two directions. The references are uniform in their reliance on an elastomeric loading or expander ring disposed within retaining lips. The ring expands or contracts under the force exerted by the retaining lips.

It is a primary objective of the present invention herein disclosed to provide a means for selective bleeding of pressure fluid such that when the fluid is exerted in one direction, the assembly provides an effective high pressure seal. When the fluid is exerted in the opposite direction, the assembly allows for bleeding of the fluid across the seal, relieving the pressure.

It is another objective of this invention to provide a seal assembly which includes a nonelastomeric loading or spacer ring which is not susceptible to fatigue or distortion.

It is a further objective of this invention to provide a seal assembly which includes a metal back-up ring positioned against a point of fluid departure, which can provide an effective sealing surface for pressures of up to 20,000 pounds per square inch without being extruded through the point of fluid departure.

SUMMARY OF THE INVENTION

These and other objectives are accomplished by a deformable high pressure seal assembly which allows for selective bleeding. The seal assembly includes a resilient seal ring having a cavity formed to opposed lip members. One corner section of the seal ring is removed. A metal spacer ring is disposed within the seal ring cavity, and a metal back-up ring is located adjacent the removed corner section of the seal ring. When subjected to high pressure fluid from one direction, the resilient seal ring pivots about the metal spacer ring so as to permit bleeding of the fluid across the seal, relieving the pressure thereon. When subjected to pressure in the reverse direction, the seal ring is forced against the back-up ring which is in turn forced against a fluid opening, eliminating seepage through it. This is explained in further detail hereinbelow.

The novel features which are believed to be characteristic of the invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

The detailed description of the invention herein described will be made with reference to the accompanying drawings wherein.

DETAILED DESCRIPTION OF THE INVENTION

Figure 1:
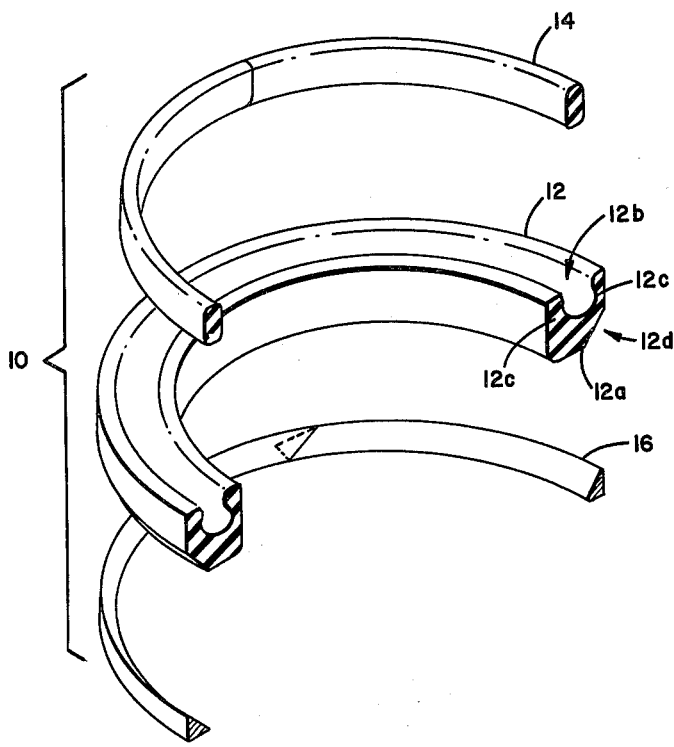
FIG. 1 is an exploded perspective view of the inventive seal ring assembly.

FIG. 1 illustrates an exploded view of a first and preferred embodiment of the inventive seal assembly 10. Seal assembly 10 consists of a resilient seal ring 12, a split metal spacer ring 14, and a split metal back-up ring 16. When installed in an annular channel and subjected to fluid pressure, the components of seal assembly 10 interact to allow bleeding when the pressurized fluid comes from one direction, while providing an effective seal when the pressurized fluid comes from the opposite direction.

The selective bleeding capability of the seal assembly 10 is provided by the design and composition of the individual components. The resilient seal ring 12 is preferably made from a hard, but somewhat flexible elastomeric or similar plastic material. Such materials, i.e., rubbers, and the like, are well known in the art and will not be discussed in detail herein. The seal ring 12 has a generally U-shaped cross-section defined by a base 12a, annular channel 12b, and two lips 12c which surround the channel 12b. The seal ring base 12a has a triangular section 12d removed from one corner.

The spacer ring 14 has an oblong cross-section of width such that the spacer ring 14 can be positioned within the annular channel 12b without contacting the seal ring lips 12c in the normal (i.e., unpressurized) state. This allows the resilient seal ring lips 12c to rotate inward towards the spacer ring 14 allowing for selective bleeding of pressure across the seal as discussed hereinbelow. Spacer ring 14 is split to allow for expansion and easy installation. When disposed in position, ring 14 extends slightly beyond the ends of lips 12c. Preferably, spacer ring 14 is made of metal or other hard, nonextrudable material.

The back-up ring 16 has a triangular cross-section which corresponds to the triangular section 12d removed from the seal ring base 12a. The back-up ring 16 contacts the seal ring base 12a and is wedged into proper position by the sealing base 12a, thereby preventing fluid leakage. This enables the assembly to act as an effective high pressure seal, such as, for example, in a gate valve or the like. The composition of the back-up ring 16 allows it to withstand pressures of up to 20,000 pounds per square inch, and preferably metal or another hard, nonextrudable material is used. The back-up ring 16 is also split; this time an angular split is formed. Expansion and ease of installation are thereby achieved.

Figure 2:
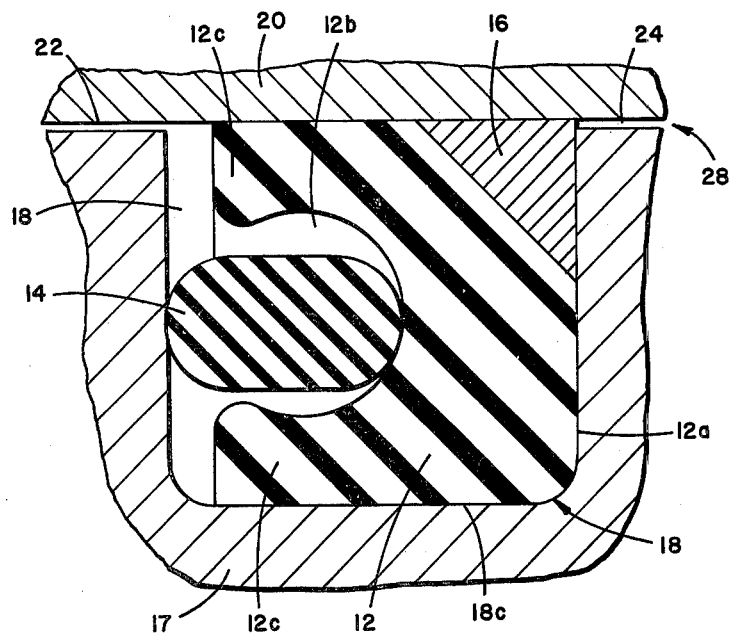
FIG. 2 is an enlarged fragmentary sectional view of the inventive seal assembly of FIG. 1.

A more detailed description of the operation of the inventive seal assembly 10 is now made with reference to FIG. 2. Here, there is illustrated a circular member 17 with an annular groove 18 having a front wall 18a and a rear wall 18b. The member 17 is surrounded by an outer casing 20 which is slightly removed from the groove 18, creating a front opening 22 and rear opening 24 through which a fluid under pressure may pass. Such configurations are typically found in a gate valve, and the like.

The width of the seal ring 12 is selected so as to be sufficient to span the entire height of the annular groove 18 and come into sealing contact with the outer casing 20. The spacer ring 14 is positioned in the annular channel 12b a spaced distance from the inwardly extending lips 12c. When no pressure is introduced into the system, the spacer ring 14 is resiliently retained between lips 12c. The size of ring 14 is usually selected such that a gap is formed between ring 14 and the front wall 18a of the groove 18. The back-up ring 16 is wedged between the base 12a, the rear wall 18b, and the outer casing 20, thereby obstructing opening 24.

Figure 3:
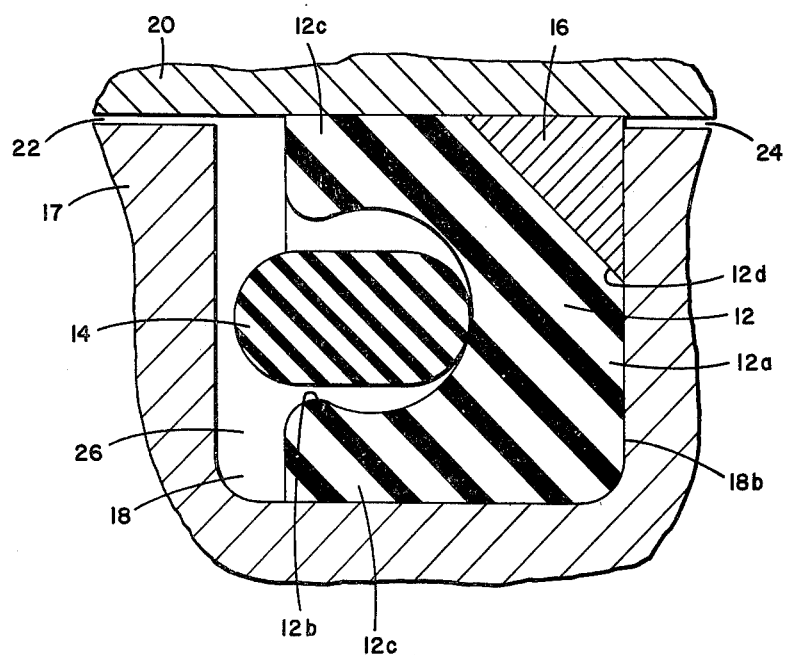
FIG. 3 is an enlarged fragmentary sectional view of the inventive seal assembly of FIG. 1 under fluid pressure from the left.

FIG. 3 illustrates the operation of the inventive seal assembly 10 acting as an effective seal in opposition to pressure fluid from one direction. The high pressure fluid enters groove 18 through the front opening 22 and is directed rearwardly as indicated by the arrow 26. The high pressure of the fluid forces the seal ring 12 rearward against the back-up ring 16, as indicated by arrows 26a, thereby firmly wedging the back-up ring 16 against the rear opening 24. Because of the hard composition and placement of ring 16, it acts to prevent extrusion of the sealing ring 12 at high pressure which in turn precludes any fluid from passing across the ring assembly 10. In this manner pressures up to 20,000 psi are prevented from crossing assembly 10 without any damage or seal failure. Note how lips 12c deform outwardly and away from ring 14 when subjected to pressure through opening 22.

Figure 4:
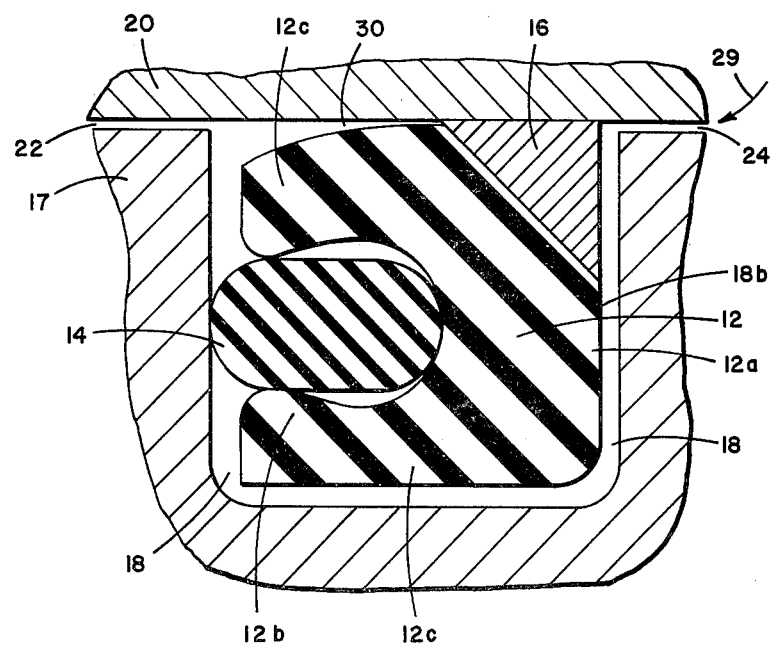
FIG. 4 is an enlarged fragmentary sectional view of the inventive seal assembly of FIG. 1 under fluid pressure from the right.

The operation of the inventive assembly 10 as a seal which allows for bleeding in one direction is illustrated in FIG. 4. In FIG. 4, fluid under pressure enters the groove 18 through the rear opening 24 in the direction indicated by arrow 28. With the fluid entering from the rear, the back-up ring 16 is forced forward against the seal ring 12, thereby forcing the seal ring 12 against the spacer ring 14. The resiliency of seal ring 12 causes those sections of the seal ring 12 in abutment with sections 18c of groove 18 and casing 20 to flex inward thereby creating a pathway across assembly 10. This action is caused by a number of factors; to wit: the resiliency of seal ring 12, the inward flexing of lips 12c about ring 14, and the angular split in the back-up ring 16 which permits some fluid through opening 24 to pass thereacross. These various factors create a pathway 30 through which the fluid under pressure can travel across the top and bottom of seal assembly 10 to the front opening 22, thereby relieving the pressure across the seal assembly 10. Using pressures less than 500 psi has been found to be sufficient to bleed across assembly 10.

While only a limited number of embodiments of the present invention have been discussed herein, it will be readily apparent to persons skilled in the art that certain changes and modifications in the invention may be made without departing from its spirit. For example, the seal member, spacer ring and back-up ring are preferably circular so as to be disposed about a circular member. Other shapes are also within the scope of this invention. Further, depending upon the pressure being used, the need for back-up ring 16 may not be present. Accordingly, the foregoing disclosure and description are for illustrative purposes only and do not in any way limit the invention, which is defined only by the claims.

What is claimed is:

1. A seal assembly for forming a high and low pressure seal between two surfaces between which pressurized fluid may enter, comprising:
   a seal member having a lip member defining a channel;
   a back-up member disposed adjacent one side of said seal member; and
   a spacer member positioned in said channel in said seal member wherein said seal member, back-up member and spacer member are arranged and configured such that when fluid flows between said surfaces in one direction, it is prevented from flowing across said assembly, and when said fluid flows between said surfaces in the opposite direction, it is permitted to flow across said seal assembly.

2. A seal assembly according to claim 1 wherein said seal member is elastomeric and said back-up member is metal.

3. A seal assembly disposed in a device having a space with openings at each end through which a fluid under pressure may enter and escape, comprising:

a seal member disposed in said space in said device, having an annular channel formed on one side thereof;

a spacer ring disposed within said annular channel of said seal ring; and a back-up ring disposed in said space in said device adjacent said seal ring such that when said fluid enters said space through one of said openings, said seal ring is forced against said back-up ring thereby firmly retaining said back-up ring in engagement over the other opening preventing passage of fluid therethrough, and when fluid enters the other opening, said back-up ring is forced against said seal ring and said seal ring deforms about said spacer ring creating a passage through which fluid may pass.

4. A seal assembly according to claim 3 wherein said seal member has a generally U-shaped cross-section and is made of an elastomeric material.

5. A seal assembly according to claim 3 wherein said seal member is disposed in an annular space in said device.

6. A seal assembly according to claim 3 wherein said spacer ring has a generally oblong cross-section.

7. A seal assembly according to claim 3 wherein said back-up ring has a generally triangular cross-section.

8. A seal assembly according to claim 3 wherein said seal member includes opposing lip member on each side of said annular channel.

9. A seal assembly according to claim 8 wherein said spacer ring extends beyond the ends of said lip members.

10. A seal assembly according to claim 3 wherein said seal ring deforms about said spacer ring so as to form a passage adjacent the top and bottom of said space in said device.

11. A seal assembly for forming a high and low pressure seal in a device having openings at each end through which a fluid under pressure may enter and escape, comprising:

a resilient seal member disposed in said space in said device, said seal member forming an annular channel bounded by inwardly extending lip members;

a generally hard, oblong spacer ring disposed in said channel such that said spacer ring extends beyond the end of said lip members; and wherein said seal member and spacer ring are arranged and configured such that when fluid enters the space in said device through one of said openings at a predetermined pressure, said lips on said seal ring flex outwardly and away from said spacer ring enabling said assembly to prevent the passage of fluid thereacross, and when fluid enters the space in said device through the other of said openings at a predetermined pressure, said lips on said seal ring flex inwardly and toward said spacer ring enabling said assembly to permit the passage of fluid thereacross.

* * * * *